INVENTORS
STANLEY GALUS
MARVIN CAMRAS
BY James W. DeSimone
ATTYS.

INVENTORS
STANLEY GALUS
MARVIN CAMRAS
BY James W. DeSimone
Att'y 3,278,132
REEL LOCK Marvin Camras, Glencoe, and Stanley A. Galus, Chicago, Ill., assignors to IIT Research Institute, Chicago, Ill., a corporation of Illinois Filed Oct. 31, 1963, Ser. No. 320,493
18 Claims. (Cl. 242—68.3)

This invention is directed to reel latches and specifically to a latch for tape reels.

The latch mechanism of the present invention is particularly useful with reels of magnetic tape or with a threading transducer machine having recessed reel housings such as that described in our co-pending application Serial No. 299,208 filed August 1, 1963.

Often times during high speed wind and re-wind operations reels will lift off their spindles because of their high angular velocities. Because of this, several reel locks of one form or another have been designed to lock the reels on their respective spindles. However, such locks are difficult to manipulate or are detachable and thus are frequently misplaced and not used. Also, in reeled tape systems wherein the reels are recessed, it is difficult to insert the reel in its proper orientation—or to remove it.

Accordingly, it is the general object of this invention to provide an improved reel latch.

Another object of this invention is to provide an improved non-detachable tape reel latch.

A further object of this invention is to provide an improved non-detachable tape reel latch that is easy to manipulate.

A still further object of this invention is to provide an improved non-detachable tape reel latch that is easy to manipulate and does not require orientation of the reel before engaging the drive spindle.

Yet still another object of this invention is to provide an improved non-detachable reel latch that automatically indexes the drive keys with the reel when the machine is operated.

And yet another object of this invention is to provide an improved non-detachable reel latch particularly useful for machines with depressed reel housings with reel release means which eject the reel from the housing upon release thereof.

Yet still another further object of this invention is to provide an improved reel latch having laterally deflectable reel engaging means which move into and out of engagement with the reel by the application of pressure thereto.

And yet still another further object of this invention is to provide an improved reel latch laterally deflectable reel engaging means which move into and out of engagement with the reel by the application of pressure thereto against accidental release of the reel.

The foregoing and other objects, features and advantages of this invention will become more apparent to the readers from the following detailed description taken in connection with the accompanying drawings, in which.

Figure 1:
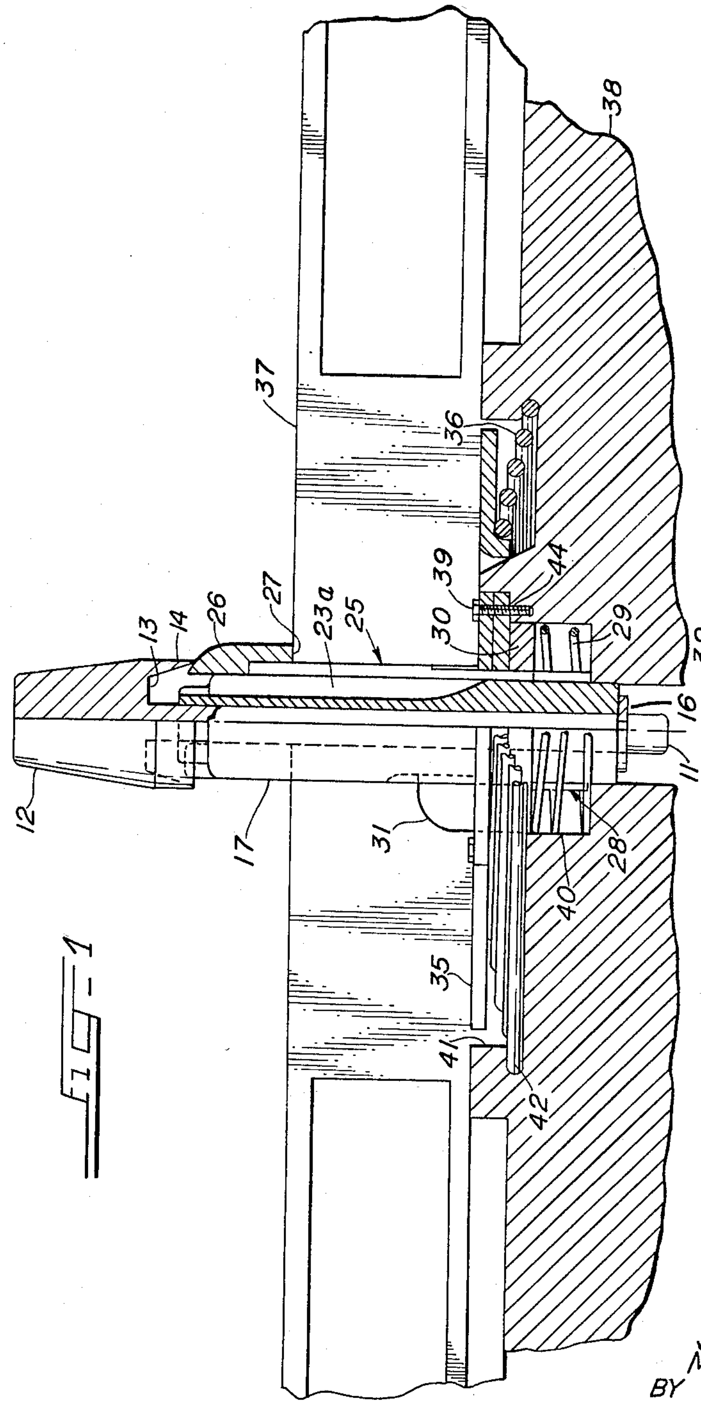
FIGURE 1 is a view in elevation, partly in section of the reel latch mechanism of this invention.
Figures 3, 4, 5, 6, 7, 8:
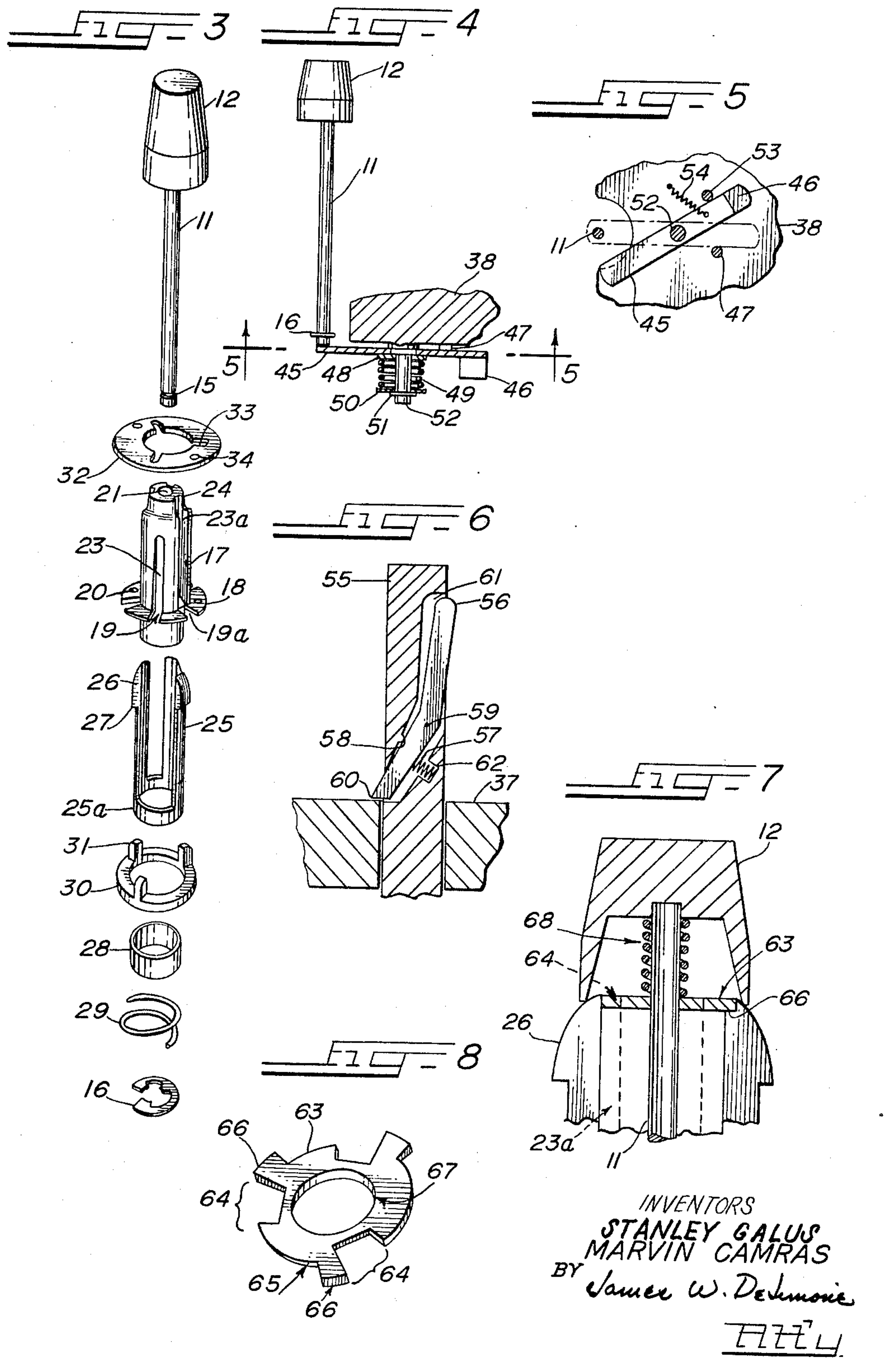
FIGURE 3 is an exploded parts assembly useful in describing the cooperation and assembly of elements of the mechanism.
FIGURE 4 is an illustration of an additional feature of this invention.
FIGURE 5 is a view of FIGURE 4 looking in the direction of arrows 5—5.
FIGURE 6 is a sectional view of the essential elements of an alternative embodiment.
FIGURE 7 is a sectional view of an alternative embodiment.
FIGURE 8 is a perspective view of the locking member described in connection with FIGURE 7.

Referring now in detail to FIGURES 1 and 3, a reel 37 is retained on spindle 17 by means of retaining edges 27 on laterally deflectable, upward extending, fingers 25. Fingers 25 are equally spaced about the periphery of circular base 25*a*. Fingers 25 are designed to pass through slots 19*a* in flange 18 so that base 25*a* rests against the bottom thereof. In this position, fingers 25 fit into tapered recesses 23*a*. Recesses 23*a* are deep enough at the upper end of spindle 17 to permit sufficient internal deflection to allow reel 37 to pass over fingers 25 without engaging surfaces 27. Reel 37 is of the standard type used in home tape recorders, with a center hole that fits on a 5⁄16" shaft, and having three slots (drive grooves 43) extending radially from the center hole, the slots being about 1⁄16" wide by 5⁄32" long. The reels are usually constructed of molded plastic and measure approximately ½" high.

The reel release is actuated by cap 12 attached to shaft 11. Shaft 11 passes through bore 21 in spindle 17. Shaft 11 is fixed in position in spindle 17 by means of snap ring 16 in slot 15 as is best illustrated in FIGURE 1. Cap 12 (FIGURE 1) sits far enough above tapered ends 26 of fingers 25 to permit the reel engaging surfaces 27 to extend over the upper surface of reel 37 to lock it into position on the spindle.

Cap 12 has a tapered hollow cavity therein to permit fingers 25 to deflect laterally as cap 12 moves longitudinally of the spindle axis. In other words, taper 14 rides on taper 26 and when cap 12 is fully depressed, forces fingers 25 inwardly a sufficient amount to clear reel 37. It is noted that the largest outer diameter of cap 12 is smaller than the bore of reel 37.

Fingers 25 are preferably constructed from strong resilient metal. The resiliency of the metal always restores cap 12 in the upper position whenever the pressure on cap 12 is removed. This feature also provides positive locking action of reel 37 when it is inserted on the spindle. That is to say, cap 12 need not be depressed when reel 37 is inserted because the pressure applied to the reel will force fingers 25 into slots 23*a* but as soon as reel 37 clears surface 27, fingers 25 will pop out and lock the reel on the spindle. It will be observed in FIGURE 1 that the base portion of spindle 17 is tapered in recess 23*a*. This taper is preferred to enhance the mechanical strength of the spindle.

In order to facilitate easy removal of reel 37 and to assist in positive locking action upon insertion of the reel, automatic reel ejection means are provided. Referring now to FIGURES 1 and 3, a recess 41 in turntable 38 is adapted to house a conical spring 36. Spring 36 is attached at its upper end to butt plate 35. Spring 36 is retained in recess 41 by annular groove 42. Spring 36 in its relaxed position extends beyond the surface of turntable 38, but when reel 37 is engaged on the spindle it is compressed in recess 41. When cap 12 is depressed, surfaces 27 disengage from reel 37 and then spring 36 automatically forces reel 37 off the spindle. Obviously the force with which reel 37 will be ejected depends on the compliance of spring 36 which may vary depending on the application.

Figure 2:
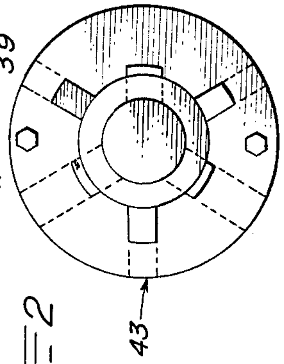
FIGURE 2 is a diagrammatic plan view of the drive keys and drive grooves useful in explaining the automatic indexing feature of this invention.

Referring now to FIGURES 1 and 2, drive keys 31 (extending upwardly of member 30) are designed to be vertically deflectable above and below the upward extent of member 30. By this design, reel drive grooves 43 need not be properly oriented with drive keys 31 before insertion of reel 37 on the spindle. On the contrary, reel 37 may be inserted in any orientation because keys 31 will be depressed into housing 40 (in turntable 38) and remain in the depressed position until drive grooves 43 are aligned with them. When the drive is engaged, turntable 38 including drive keys 31 will rotate. However, reel 37 will not rotate because it is not engaged by drive keys 31 which are at that moment depressed into housing 40. As drive keys 31 are rotated, they will, in at least one-third revolution, come into alignment with grooves 43. At the instant of alignment, spring 29 will force keys 31 into corresponding grooves 43 by pushing against disc 30. Reel 37 is then engaged and rotating.

In assembly, after fingers 25 are fixed in position and member 30 is passed on to the lower end of spindle 17 beneath base 25*a*, a spacer 28 is passed over the lower end of spindle 17. As will be seen in FIGURE 1, spacer 28 accurately seats against the lower surface of recess 40 and permits member 30 to ride up and down over a constant diameter surface.

It will be noted that drive keys 31 pass through slots 19 into recesses 23 of spindle 17. These recesses 23 need not be tapered as illustrated. Recesses 23 should, however, be clearly defined because they act as guides for drive keys 31 and as supports therefor to prevent shearing of keys 31. Finally, a locking disc 32 is passed over spindle 17 and fingers 25 with its holes 34 aligned with similar holes 20 on flange 18 of spindle 17. Similarly, holes 34 and 20 are aligned with threaded bores 44 in turntable 38 and the entire assembly is thus operatively secured to turntable 38 by screws 39.

In FIGURES 4 and 5, means are illustrated to prevent unintentional release of reel 37. As previously described, when cap 12 is depressed, fingers 25 are moved out of engagement with reel 37 and it is forced up from the spindle. In this embodiment, however, an arm 45 under certain conditions will block the depression of shaft 11, thus preventing release of the reel. Arm 45 is rotatably mounted on the downwardly extending shaft 52 forming a part of turntable 38. At that end of arm 45 opposite shaft 11 a weight 46 is attached. Arm 45 is urged into a position whereby it does not block the depression of shaft 11 when turntable 38 is not rotating. This is accomplished by attaching spring 54 to the bottom of turntable 38 and to arm 45 as is illustrated in FIGURE 5. As is well known in mechanics, a rotating weight will seek the greatest radius from its center of rotation. This principle is utilized by the fact that when turntable 38 is rotating the center of rotation passes through the center of shaft 11 and the centrifugal force resulting from rotation of turntable 38 is enough to override the tension of spring 54 and shift arm 45 to the dotted line position. To insure that arm 45 is accurately positioned beneath shaft 11 when turntable 38 is rotating, post 47 extending beneath turntable 38 is provided.

In certain situations it may be necessary or desirable to remove the reel even though the machine is rotating. To accomplish this, an override spring 49 is provided. Spring 49 is placed between butt plates 48 and 50 on shaft 52 and fixed in this position by means of snap ring 51. By this arrangement the anti-release function of arm 45 may be overidden by sufficient pressure on cap 12 to overcome the force of spring 49 against arm 45. That is to say, even though arm 45 is in the locking position and whether or not reel 37 is rotating (even when the machine is off, arm 45 may stick) the reel may be released.

In FIGURE 6, an alternative means for providing against unintentional release of reel 37 is illustrated. In this embodiment, a spindle 55 is designed with a properly contoured cavity 61 at its upper end. Cavity 61 is designed to accommodate arm 56 so that it is rotatable about pivot pin 59 which attaches arm 56 to spindle 55. Arm 56 extends beyond the outer diameter of spindle 55 at its lower end and is designed to fix reel 37 in the operative position at 60. A spring 57 seated in bore 62 of spindle 55 urges arm 56 in the fashion shown to engage and retain reel 37. The outward extent of arm 56 at its lower end is limited by tip 58 on spindle 55.

In this embodiment, reel 37 cannot be released unless a lateral pressure is applied to arm 56. An accidental bumping of the upper end of the spindle 55, FIGURE 6, will not cause release of reel 37. As a further modification, identical arms 56 may be arranged to project from both sides of spindle 55 so that directly opposite lateral pressures have to be applied to release the reel. It will be noted that in this embodiment the drive key arrangement of FIGURE 1 may be utilized.

FIGURES 7 and 8 depict an alternative preferred means for preventing unintentional release of reel 37 after it is placed on the spindle. Shaft 11 extending into cap 12 is seated therein. A locking washer 63 is seated on shaft 11 and pressed spindle 17 by spring 68. Washer 63 has rigid sections 65 and openings 64. Openings 64 are large enough—and properly spaced—to permit fingers 25 to move inwardly when cap 12 is depressed to release reel 37. However, when cap 12 is rotated, member 63 will rotate therewith because spring 68 acts as a clutch therebetween. Rotating cap 12, a fraction of a turn, causes sections 65 or openings 64 to move into position opposite fingers 25 either to permit or block their internal deflection. When cap 12 is rotated in either direction, detents 66 limit rotation so that at either limit, cap 12 is or is not depressable. Member 63 has a bore 67 passing therethrough which is just large enough to pass onto shaft 11.

By this design, depending on whether or not a reel is being placed or removed from the spindle, the operator need merely rotate cap 12 a fraction of a turn to lock or unlock the reel release mechanism and thus, obviate the possibility of unintentional release. If the operator rotates cap 12 more than a fraction of a turn, cap 12 and shaft 11 continue to rotate, but detents 66 will stop further rotation of washer 63. That is to say, spring 68 provides sufficient friction between cap 12 and washer 63 so that barring obstruction (detents 66) they rotate in unison.

Obviously, modifications will occur to those skilled in this art without departing from the novel scope and spirit of this invention. Along these lines, it should be observed that although this invention was described with reference to tape reels the invention is not restricted thereto. For example, reels of film, spools of thread and other winding systems where it is desirable to fix the reel, spool, etc. on its spindle are, to list a few, other situations wherein this invention has utility. Accordingly, it is intended that this invention be limited only by the scope of the appended claims.

We claim as our invention:

1. A reel lock to retain reels on a spindle comprising in combination:
   - a spindle;
   - first means having spaced upright fingers, which are laterally deflectable, operatively attached to said spindle;
   - reel locking means on said first means which move into and out of a reel locking mode depending on the deflection of said first means;
   - second means operatively connected to said spindle for controlling the lateral deflection of said first means to control the mode of said locking means;
   - depressable drive keys spaced about said spindle for engagement with drive grooves of a reel on said spindle which keys move into engagement with said grooves upon alignment therebetween; and
   - third means operative to block said second means to prevent unintentional release of said locking means.

2. A reel lock comprising in combination:
   - a turntable;
   - a spindle connected to said turntable;
   - first means having spaced upright fingers, which are laterally deflectable, operatively attached to said spindle;

reel locking means on said first means which move into and out of a reel locking mode depending on the deflection of said first means;

second means operatively connected to said spindle for controlling the lateral deflection of said first means to control the mode of said locking means;

depressable drive keys spaced about said spindle for engagement with drive grooves of a reel on said spindle which keys move into engagement with said grooves upon alignment therebetween as said turntable rotates;

third means operative to block said second means to prevent unintentional release of said locking means; and reel ejection means operative to thrust the reel from the spindle when the locking means is not in the reel locking mode.

3. A reel lock comprising in combination:

a turntable;

a spindle projecting from said turntable;

reel locking means on said spindle which move into and out of a reel locking mode and normally being in locking mode but permitting a reel to be inserted on said spindle and automatically locked thereon;

control means operatively connected to said spindle for controlling said locking means to release said reel;

depressable drive keys spaced about said spindle for engagement with drive grooves of a reel on said spindle which keys move into engagement with said grooves upon alignment therebetween as said turntable rotates;

means operative to block said control means to prevent unintentional release of said reel; and reel ejection means associated with said spindle and operative to thrust the reel from its operative position when the reel is unlocked from the spindle.

4. A reel lock comprising in combination:

a spindle;

reel locking means on said spindle which move into and out of a reel locking mode and normally being in locking mode but permitting a reel to be inserted on said spindle and automatically locked thereon;

manually operable control means permitting control of said locking means to release a reel;

reel ejection means associated with said spindle operative to thrust the reel from its operative when the reel is unlocked from the spindle;

depressable drive keys spaced about said spindle for engagement with drive grooves on a reel which keys move into engagement with said grooves upon alignment therebetween; and blocking means operative to block said manual control means to prevent unintentional release of said reel.

5. In the apparatus of claim 4 wherein said blocking means is responsive to rotation of said spindle to block release of a reel while it is in motion.

6. In the apparatus of claim 5 wherein an override is provided whereby a reel may be released even if it is rotating.

7. A reel lock comprising in combination:

a turntable;

a spindle connected to said turntable;

reel locking means on said spindle having spaced upright fingers which move into and out of a reel locking mode and normally being in locking mode but permitting a reel to be inserted on said spindle and automatically locked thereon;

control means operatively connected to said spindle for moving said fingers and thereby controlling the mode of said locking means to permit release of a reel;

depressable drive keys spaced about said spindle for engagement with drive grooves of a reel on said spindle which keys move into engagement with said grooves upon alignment therebetween as said turntable rotates;

a detent operative to block the movement of said fingers by said control means to prevent unintentional release of said locking means; and reel ejection means housed in said turntable operative to thrust the reel from the spindle when the locking means is released.

8. A reel lock comprising in combination:

a turntable;

a spindle connected to said turntable;

reel locking means on said spindle having spaced upright members which move into and out of a reel locking mode and being normally in locking mode but permitting a reel to be inserted on said spindle and automatically locked thereon;

control means operatively connected to said spindle for deflecting said members thereby controlling the mode of said locking means to permit release of a reel;

depressable drive keys spaced about said spindle for engagement with drive grooves of a reel on said spindle which keys move into engagement with said grooves upon alignment therebetween as said turntable rotates;

a rotatable detent operative upon rotation thereof to block the deflection of said members by said control means to prevent unintentional release of said locking means; and reel ejection means housed in said turntable operative to thrust the reel from the spindle when the locking means is not in the reel locking mode.

9. A reel mounting assembly comprising in combination:

a spindle having a central bore extending axially thereof and opening at a free end thereof;

first means operatively attached to said spindle and having spaced axially extending laterally deflectable fingers extending along said spindle, said fingers having respective free ends adjacent the free end of said spindle and said fingers having reel engaging faces carried thereby and engageable with the side of a reel which is proximate to the free end of said spindle for overlying and locking a reel in an operating position on said spindle when the fingers are in a laterally outward reel engaging position; and second means overlying the free end of said spindle and having a shaft reciprocally disposed in said central bore of said spindle to guide said second means for axial reciprocation relative to said spindle from an initial position to a depressed position; said second means having an interior cavity for receiving the free end of each finger as the second means is shifted from its initial position to its depressed position and for forcing the free end of each finger laterally inwardly to deflect said fingers laterally toward said spindle and thereby to shift said reel engaging faces of said fingers out of their reel engaging position.

10. A reel mounting assembly comprising in combination:

a spindle having a free end;

first means operatively attached to said spindle remote from said free end thereof and having spaced axially extending laterally deflectable fingers extending along said spindle toward the free end thereof and terminating in free ends;

said fingers having reel locking means thereon for lateral shifting into and out of a reel locking mode as the fingers are deflected between a laterally outward position, said reel locking means being adjacent the free ends of said fingers and being engageable with the side of a reel proximate to the free end of said spindle;

second means overlying the free end of said spindle and guided for axial reciprocal movement thereby from an initial position to a depressed position, said second means having an interior cavity for receiving the free end of each finger as the second means is shifted from its initial position to its depressed position and for forcing the free end of each finger laterally inwardly to shift said reel locking means out of reel locking mode.

11. A turntable assembly for mounting a record carrying reel comprising in combination:

a turntable;

a spindle projecting from said turntable to receive a reel in an operative position adjacent the turntable;

reel locking means on said spindle shiftable into and out of a reel locking mode;

axially shiftable control means operatively connected to said locking means for controlling said locking means and responsive to a manual pressure acting axially toward the turntable to shift the reel locking means out of reel locking mode; and resilient reel ejection means associated with said turntable and disposed for continuously engaging a reel in said operative position on said spindle for resiliently pressing said reel against said reel locking means and operative automatically to thrust a reel from the operative position when the control means is actuated to shift the reel locking means out of the reel locking mode.

12. The assembly of claim 11 with:

means operative to block said control means against axial shifting to prevent unintentional release of said reel.

13. The assembly of claim 11 with:

said reel locking means comprising angularly spaced spring fingers extending along said spindle and deflectible laterally into and out of a reel locking mode;

said control means being operatively connected to said fingers for moving said fingers toward said spindle to release said reel;

depressible drive keys spaced about said spindle for engagement with drive grooves of a reel in said operative position which keys move into engagement with said grooves upon alignment therebetween as said turntable rotates relative to the reel; and blocking means comprising a member shiftable angularly relative to said control means to prevent unintentional release of said locking means.

14. The assembly of claim 11 with:

said reel ejection means comprising a conical spring secured at one end to said turntable, and an annular plate carried at the other end of said spring for engagement with a reel in said operative position and for urging the reel against the reel locking means while the reel locking means remains in locking mode.

15. The assembly of claim 11 with:

means responsive to rotation of said turntable to block release of said reel locking means.

16. The assembly of claim 11 with:

the turntable having a circular recess adjacent said spindle;

a ring with drive keys secured thereto mounted for axial movement in said recess; and a compression spring seated in said recess and acting on said ring to urge the drive keys into driving engagement with a reel in said operative position on said spindle.

17. The assembly of claim 16 with:

said turntable having an annular recess surrounding said circular recess; and said reel ejection means comprising a wire compression spring seated in said annular recess and encircling said spindle.

18. The assembly of claim 11 with:

said turntable having an annular recess encircling said spindle; and said reel ejection means comprising a wire compression spring seated in said annular recess and encircling said spindle.

References Cited by the Examiner

UNITED STATES PATENTS

| | | | |
|---|---|---|---|
| 696,137 | 3/1902 | Felbel et al. | 242—68.3 |
| 2,254,605 | 9/1941 | Foster | 242—68.3 |
| 2,983,531 | 5/1961 | Moro | 242—68.3 X |
| 3,121,543 | 2/1964 | Michaels | 242—68.3 X |
| 3,154,262 | 10/1964 | Cohen et al. | 242—68.3 |

FRANK J. COHEN, *Primary Examiner.*

MERVIN STEIN, W. S. BURDEN, *Assistant Examiners.*